(12) United States Patent
Shimizu et al.

(10) Patent No.: US 10,124,748 B2
(45) Date of Patent: Nov. 13, 2018

(54) VEHICULAR HIGH-VOLTAGE WIRE AND WIRE HARNESS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Takeshi Shimizu, Mie (JP); Yasushi Atsumi, Mie (JP); Masahiro Hagi, Mie (JP); Satoshi Sasaki, Mie (JP); Satoshi Murao, Mie (JP); Masaharu Suetani, Mie (JP); Hirotaka Baba, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/673,575

(22) Filed: Aug. 10, 2017

(65) Prior Publication Data

US 2018/0056897 A1  Mar. 1, 2018

(30) Foreign Application Priority Data

Aug. 31, 2016 (JP) .................................. 2016-169727
Dec. 19, 2016 (JP) .................................. 2016-245806

(51) Int. Cl.
*H01B 9/02* (2006.01)
*B60R 16/02* (2006.01)
(Continued)

(52) U.S. Cl.
CPC ......... *B60R 16/0215* (2013.01); *H01B 7/183* (2013.01); *H01B 9/02* (2013.01); *H01B 7/0275* (2013.01)

(58) Field of Classification Search
None
See application file for complete search history.

(56) References Cited

U.S. PATENT DOCUMENTS 2,626,223 A * 1/1953 Ford ...................... C08G 69/44
                                                    156/52
3,642,531 A * 2/1972 Peterson ................ C08K 13/04
                                                    428/382

(Continued)

FOREIGN PATENT DOCUMENTS

JP     2016063557 A    4/2016

*Primary Examiner* — William H Mayo, III
*Assistant Examiner* — Krystal Robinson
(74) *Attorney, Agent, or Firm* — Reising Ethington, P.C.

(57) ABSTRACT

A vehicular high-voltage wire that can suppress short-circuiting between a positive wire and a negative wire that are connected to an in-vehicle high-voltage battery. A wire harness includes a positive high-voltage wire and a negative high-voltage wire that are connected to an in-vehicle high-voltage battery. The positive high-voltage wire includes a core wire that is made of a conductor and is for electrical connection to the high-voltage battery, and a protection member that is constituted by woven reinforced fibers that have an insulation property, and is shaped as a tube that surrounds the outer circumference of the core wire.

6 Claims, 3 Drawing Sheets

(51) Int. Cl.
*H01B 7/18* (2006.01)
*H01B 7/02* (2006.01)

(56) References Cited

U.S. PATENT DOCUMENTS

| | | | | |
|---|---|---|---|---|
| 4,018,962 | A * | 4/1977 | Pedlow | C09K 21/14 106/18.18 |
| 5,304,739 | A * | 4/1994 | Klug | H01B 3/443 174/102 R |
| 5,317,109 | A * | 5/1994 | Aldissi | H01R 4/18 174/82 |
| 6,028,975 | A * | 2/2000 | Davidson | G02B 6/4436 385/101 |
| 6,195,487 | B1 * | 2/2001 | Anderson | G02B 6/4416 174/23 R |
| 6,255,594 | B1 * | 7/2001 | Hudson | H01B 7/295 174/121 A |
| 6,326,551 | B1 * | 12/2001 | Adams | H01B 11/1804 174/113 C |
| 7,530,847 | B2 * | 5/2009 | Siems | H01R 13/58 439/607.41 |
| 9,050,934 | B2 * | 6/2015 | Toyama | B60R 16/0207 |
| 2002/0098357 | A1 * | 7/2002 | Keogh | B32B 1/00 428/375 |
| 2005/0045368 | A1 * | 3/2005 | Keogh | H01B 3/446 174/120 R |
| 2006/0176650 | A1 * | 8/2006 | Hogan | B60R 16/0207 361/600 |
| 2011/0088944 | A1 * | 4/2011 | Ogue | B60R 16/0215 174/72 A |
| 2011/0253441 | A1 * | 10/2011 | Doneker | H05K 9/0088 174/350 |
| 2013/0327559 | A1 * | 12/2013 | Kim | H01B 7/182 174/113 R |
| 2014/0170919 | A1 * | 6/2014 | Manipatruni | D01D 5/00 442/188 |
| 2015/0210846 | A1 * | 7/2015 | Qi | C08G 59/26 174/126.1 |

\* cited by examiner

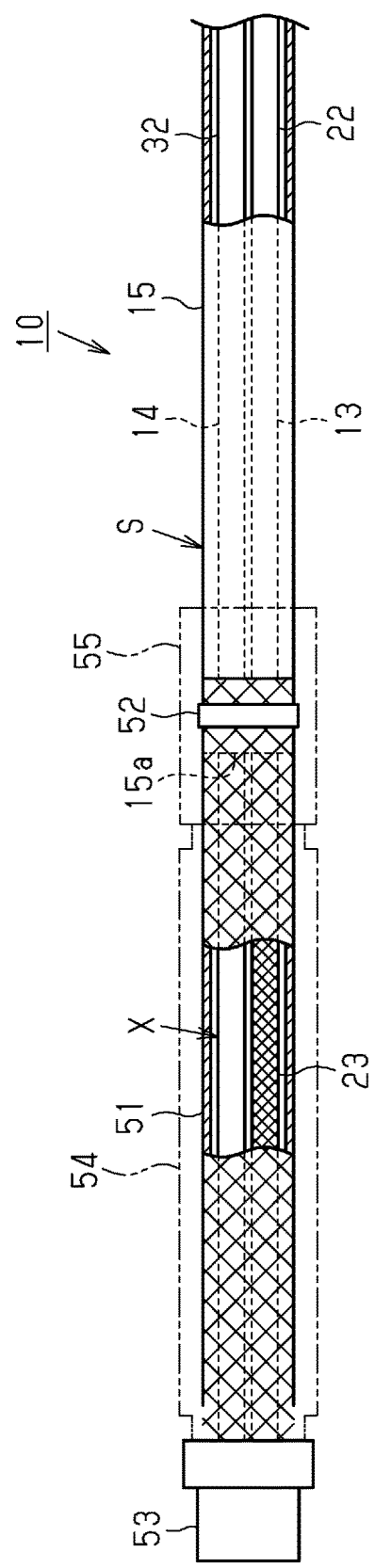

VEHICULAR HIGH-VOLTAGE WIRE AND WIRE HARNESS

CROSS REFERENCE TO RELATED APPLICATIONS

This application claims the priority of Japanese patent application JP JP2016-169727 filed on Aug. 31, 2016 and JP2016-245806 filed on Dec. 19, 2016, the entire contents of both applications are incorporated herein by reference.

TECHNICAL FIELD

The present invention relates to a vehicular high-voltage wire and a wire harness.

BACKGROUND ART

Conventionally, as shown in Patent Document 1 (JP 2016-63557A) for example, a vehicle such as a hybrid car or an electric automobile includes a motor serving as a power source for vehicle traveling, an inverter connected to the motor, and a high-voltage battery that supplies electrical power to the inverter, and the inverter and the high-voltage battery are connected to each other by a wire harness that includes two high-voltage wires, namely positive and negative high-voltage wires.

SUMMARY

In a vehicle in which equipment is connected to a high-voltage battery as described above, there is concern of short-circuiting between the two positive and negative high-voltage wires caused by impact during a collision.

The present design was achieved in order to solve the foregoing issue, and an object thereof is to provide a vehicular high-voltage wire and a wire harness that can suppress short-circuiting between a positive wire and a negative wire that are connected to an in-vehicle high-voltage battery.

A vehicular high-voltage wire for solving the foregoing issue is a vehicular high-voltage wire for electrical connection to an in-vehicle high-voltage battery, the vehicular high-voltage wire including: a core wire that is made of a conductor and is to be electrically connected to the high-voltage battery; and a protection member that is constituted by woven reinforced fibers that have an insulation property, and is shaped as a tube that surrounds an outer circumference of the core wire.

According to this configuration, the core wire is surrounded by the protection member constituted by woven reinforced fibers that have an insulation property, and therefore the impact resistance of the high-voltage wire is improved, thus making it possible to suppress short-circuiting between positive and negative core wires that are connected to the high-voltage battery.

The above vehicular high-voltage wire, may further include an insulating covering that covers the outer circumference of the core wire and is provided on an inner circumferential side of the protection member.

According to this configuration, it is possible to improve the impact resistance of the high-voltage wire with use of the protection member, while also ensuring insulation of the core wire with use of the insulating covering. Also, due to the insulating covering being provided on the inner circumferential side of the protection member, the insulating covering can be provided in the immediate vicinity of the core wire, thus making it easier to ensure insulation.

The above vehicular high-voltage wire, may further include a covering member that is made of a resin and is shaped as a tube that covers an outer circumference of the protection member.

According to this configuration, the protection member constituted by woven reinforced fibers is covered by the covering member that is made of a resin material, thus making it easier to maintain the shape of the high-voltage wire. Also, due to the outer circumference of the protection member being covered by the covering member that is made of a resin material, it is possible to further improve the impact resistance of the high-voltage wire.

In the above vehicular high-voltage wire, the protection member may be embedded inside an insulating covering that covers the outer circumference of the core wire.

According to this configuration, insulation of the core wire is ensured by the insulating covering, and the protection member is not the outermost layer of the high-voltage wire, and therefore the shape of the high-voltage wire can be easily maintained. Furthermore, the insulation layer can be constituted by a single layer while also obtaining the above-described effects, thus making it possible to suppress an increase in the diameter and weight of the high-voltage wire.

In the above vehicular high-voltage wire, the reinforced fibers of the protection member may be aramid fibers.

According to this configuration, the protection member that surrounds the outer circumference of the core wire is constituted by woven aramid fibers, thus making it possible to favorably improve the impact resistance of the high-voltage wire.

A wire harness for solving the foregoing issue includes: a plurality of electrical wires including at least one of the above-described vehicular high-voltage wires; and an exterior member that is tubular and surrounds all of the electrical wires.

According to this configuration, in the wire harness that has high-voltage wires, it is possible to suppress short-circuiting between positive and negative core wires that are connected to a high-voltage battery.

In the above wire harness, included among the plurality of wires may be a positive high-voltage wire and a negative high-voltage wire that are respectively connected to a positive terminal and a negative terminal of an in-vehicle high-voltage battery, and the protection member may be included in only one of the positive high-voltage wire and the negative high-voltage wire.

According to this configuration, the protection member is provided in only one of the positive high-voltage wire and the negative high-voltage wire that are connected to the high-voltage battery, thus making it possible to suppress short-circuiting between the core wires of the positive and negative high-voltage wire, while also suppressing a rise in manufacturing cost.

In the above wire harness, the exterior member may be a shielding member that shields all of the electrical wires.

According to this configuration, the electrical wires are collectively shielded by the shielding member, thus eliminating the need to provide the electrical wires with a shield structure, and making it possible to suppress increased complexity in the configuration of the electrical wires.

In the above wire harness, a portion or all of the shielding member in a length direction may be constituted by a braided sleeve member obtained by weaving electrically conductive strands, and the protection member may be included in a portion of the vehicular high-voltage wire that is located inside the braided sleeve member.

According to this configuration, the protection member is provided on the portion of the high-voltage wire that extends inside the braided sleeve member and has concerns regarding impact resistance, thus making it possible to effectively protect the core wire of the high-voltage wire.

According to a vehicular high-voltage wire and a wire harness of the present application, it is possible to suppress short-circuiting between a positive wire and a negative wire that are connected to an in-vehicle high-voltage battery.

BRIEF DESCRIPTION OF DRAWINGS

FIG. 5 is a schematic view of a wire harness according to a variation.

DESCRIPTION OF EMBODIMENTS

Figure 1:
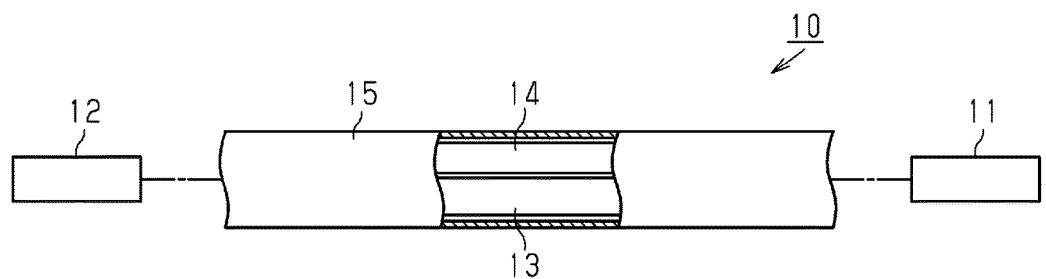
FIG. 1 is a schematic view of a wire harness according to an embodiment.

Embodiments of a vehicular high-voltage wire and a wire harness will be described below. Note that portions of configurations may be shown in an exaggerated or simplified manner in the drawings in order to facilitate the description. The dimension ratios of portions may also differ from actual dimension ratios.

As shown in FIG. 1, a wire harness 10 of the present embodiment is routed under the floor of a vehicle such as a hybrid car or an electric automobile in order to connect a high-voltage battery 11 disposed in the rear portion of the vehicle to an inverter 12 disposed in the front portion of the vehicle, for example. The inverter 12 is connected to a motor for wheel driving (not shown) that serves as the power source for vehicle traveling, and the inverter 12 generates AC power from DC power from the high-voltage battery 11 and supplies the AC power to the motor. The high-voltage battery 11 is a battery capable of supplying a voltage of several hundred volts.

The wire harness 10 includes a positive high-voltage wire 13 and a negative high-voltage wire 14 that are respectively connected to a positive terminal and a negative terminal of the high-voltage battery 11, and a shielding pipe 15 that surrounds both of the high-voltage wires 13 and 14. Ends of the high-voltage wires 13 and 14 on one side are connected to the high-voltage battery 11, and ends on the other side are connected to the inverter 12.

The high-voltage wires 13 and 14 are non-shielded electrical wires that do not have a shielding structure, and are compatible with high voltages and high currents. The high-voltage wires 13 and 14 are inserted into a shielding pipe 15 that is constituted by a metal pipe formed using a metal material such as an aluminum-based material. The shielding pipe 15 is routed under the floor of the vehicle, and is bent into a predetermined shape that corresponds to the configuration of the region under the floor. The shielding pipe 15 shields both of the high-voltage wires 13 and 14, and also protects the high-voltage wires 13 and 14 from flying rocks and the like. Note that the two ends of each of the high-voltage wires 13 and 14 extend out from the shielding pipe 15, and the portions of the high-voltage wires 13 and 14 that extend out from the shielding pipe 15 are collectively shielded by a flexible shielding members (e.g., metal braided sleeves) that are connected to the two end portions of the shielding pipe 15.

Next, the configurations of the high-voltage wires 13 and 14 will be described.

Figure 2:
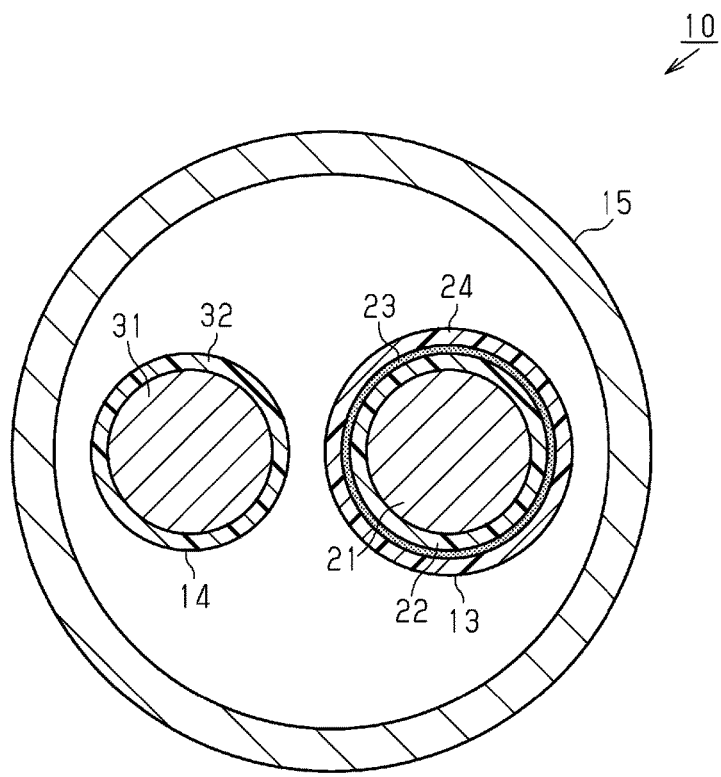
FIG. 2 is a cross-sectional view of the wire harness of the embodiment.
Figure 3:
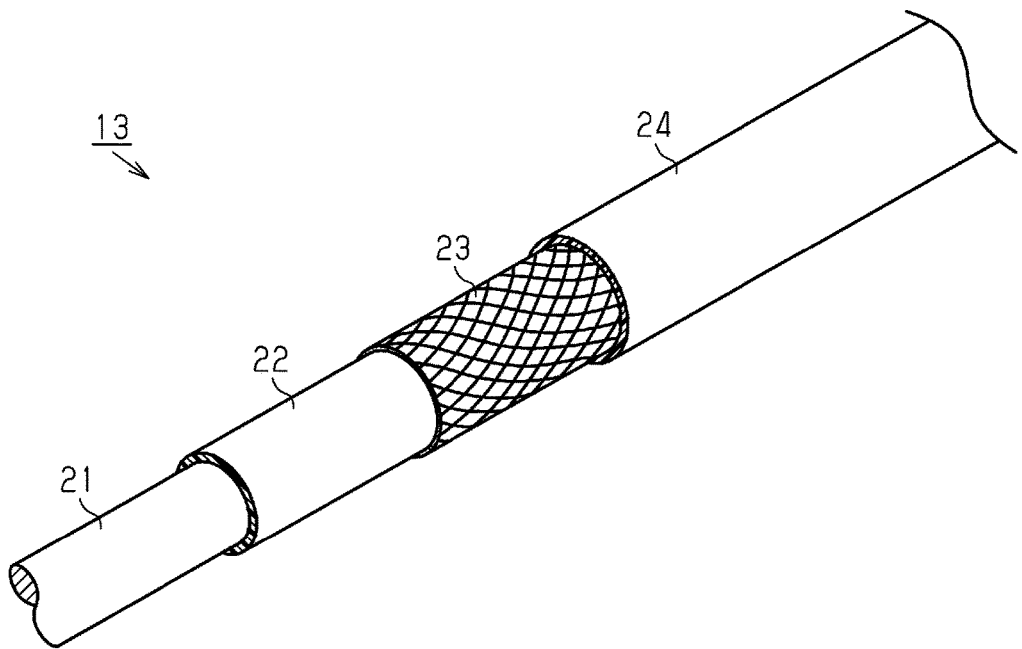
FIG. 3 is a perspective view of a positive high-voltage wire of the embodiment.

As shown in FIGS. 2 and 3, the positive high-voltage wire 13 has a configuration in which a core wire 21 constituted by a conductor is covered by three layers, namely an insulating covering 22, a protection member 23, and a covering member 24 in this order from the inner circumferential side.

The insulating covering 22 is made of a resin material. The insulating covering 22 is formed by performing extrusion coating on the outer circumferential surface of the core wire 21, and tightly covers the outer circumferential surface of the core wire 21.

The protection member 23 is tubular and covers the outer circumference of the insulating covering 22. The protection member 23 is constituted by braiding reinforced fibers that are superior in terms of insulation property and shearing resistance, and is flexible. The protection member 23 is provided over approximately the entire length of the positive high-voltage wire 13. Specifically, the protection member 23 is provided over the entirety of portion of the positive high-voltage wire 13 other than the two end portions where the core wire 21 is exposed for connection.

Examples of the reinforced fibers that constitute the protection member 23 include para-aramid fiber, polyarylate fiber, PBO (polyparaphenylene benzobisoxazole) fiber, PET (polyethylene terephthalate) fiber, ultrahigh molecular weight polyethylene fiber, PEI (polyether imide) fiber, glass fiber, and ceramic fiber, and it is preferable that one or more of these types is used in accordance with the physical properties required of the protection member 23. In the present embodiment, the protection member 23 is constituted by one of the above types, namely para-aramid fiber.

The covering member 24 is made of a resin material such as polyethylene, and is tubular. The covering member 24 is formed by performing extrusion coating on the outer circumferential surface of the protection member 23, and covers the outer circumferential surface of the protection member 23.

As shown in FIG. 2, the negative high-voltage wire 14 includes a core wire 31 constituted by a conductor, and an insulating covering 32 formed performing extrusion coating on the outer circumferential surface of the core wire 31. The negative high-voltage wire 14 does not include the protection member 23 or the covering member 24 that are included in the positive high-voltage wire 13, and has a configuration in which the protection member 23 and the covering member 24 are omitted from the positive high-voltage wire 13.

Next, actions of the present embodiment will be described.

The positive high-voltage wire 13 has a configuration in which the core wire 21 is coated by the protection member 23 that has excellent impact resistance (particularly shearing resistance) and is composed of reinforced fibers made of para-aramid fibers for example. For this reason, even if the shielding pipe 15 is damaged due to impact during a vehicle collision, it is possible to suppress the case where the core wires 21 and 31 of the positive high-voltage wire 13 and the negative high-voltage wire 14 come into direct contact or are put in a conductive state via some sort of conductor such as a broken piece of the shielding pipe 15 or another vehicle constituent member. Also, due to the protection member 23 having an insulation property, it is possible to suppress the case where the core wires 21 and 31 of the positive high-voltage wire 13 and the negative high-voltage wire 14 are put in a conductive state via the protection member 23.

Next, effects that are features of the present embodiment will be described.

The positive high-voltage wire 13 includes the protection member 23 that is constituted by woven reinforced fibers that have an insulation property, and is shaped as a tube that surrounds the outer circumference of the core wire 21. According to this configuration, the impact resistance of the positive high-voltage wire 13 is improved, thus making it possible to suppress short-circuiting between the core wires 21 and 31 of the positive high-voltage wire 13 and the negative high-voltage wire 14. Also, due to the configuration in which the impact resistance of the positive high-voltage wire 13 itself is improved by the protection member 23, it is possible to suppress short-circuiting between the core wires 21 and 31 while also contributing to space-saving by a configuration in which the high-voltage wires 13 and 14 are arranged in a single shielding pipe 15 as in the present embodiment.

The positive high-voltage wire 13 includes the insulating covering 22 that is provided on the inner circumferential side of the protection member 23 and covers the outer circumference of the core wire 21. According to this configuration, it is possible to ensure the insulation property of the core wire 21 with use of the insulating covering 22 and also improve the impact resistance of the positive high-voltage wire 13 with use of the protection member 23. Also, due to the insulating covering 22 being provided on the inner circumferential side of the protection member 23, the insulating covering 22 can be provided in the immediate vicinity of the core wire 21 (in contact with the outer circumferential surface of the core wire 21 in the present embodiment), thus making it easier to ensure insulation.

The positive high-voltage wire 13 includes the covering member 24 that is made of a resin and is shaped as a tube that covers the outer circumference of the protection member 23. In the case of a configuration in which the positive high-voltage wire 13 does not include the covering member 24, and the protection member 23 is the outermost layer of the positive high-voltage wire 13, there is a risk that that the shape of the electrical wire will not be readily maintained due to, for example, fraying of the reinforced fibers that constitute the protection member 23. In view of this, in the present embodiment, the protection member 23 is covered by the covering member 24, thus making it easier to maintain the shape of the positive high-voltage wire 13. Also, due to the outer circumference of the protection member 23 being covered by the covering member 24 that is made of a resin material, it is possible to further improve the impact resistance of the positive high-voltage wire 13. Also, due to the outermost layer of the positive high-voltage wire 13 being constituted by the covering member 24 that is made of a resin material, the positive high-voltage wire 13 can be more easily inserted into the shielding pipe 15.

Para-aramid fibers are used as the reinforced fibers that constitute the protection member 23, thus making it possible to favorably improve the impact resistance of the positive high-voltage wire 13.

The wire harness 10 includes; the positive high-voltage wire 13 that is connected to the positive terminal of the in-vehicle high-voltage battery 11 and includes the protection member 23; the negative high-voltage wire 14 that is connected to the negative terminal of the high-voltage battery 11; and the shielding pipe 15 that is tubular and shields both of the high-voltage wires 13 and 14. According to this configuration, the high-voltage wires 13 and 14 are collectively shielded by the shielding pipe 15, thus eliminating the need to provide the high-voltage wires 13 and 14 themselves with a shield structure, and making it possible to suppress increased complexity in the configuration of the high-voltage wires 13 and 14.

The protection member 23 is provided in only the positive high-voltage wire 13, and the negative high-voltage wire 14 does not have the protection member 23. According to this configuration, it is possible to suppress short-circuiting between the core wires 21 and 31 of the positive high-voltage wire 13 and the negative high-voltage wire 14 while also suppressing a rise in the manufacturing cost of the wire harness 10.

Note that modifications such as the following may be made to the above embodiment.

The positive high-voltage wire 13 of the above embodiment has a configuration in which the core wire 21 is covered by three layers, namely the insulating covering 22, the protection member 23, and the covering member 24, but the present invention is not particularly limited to this.

Figure 4:
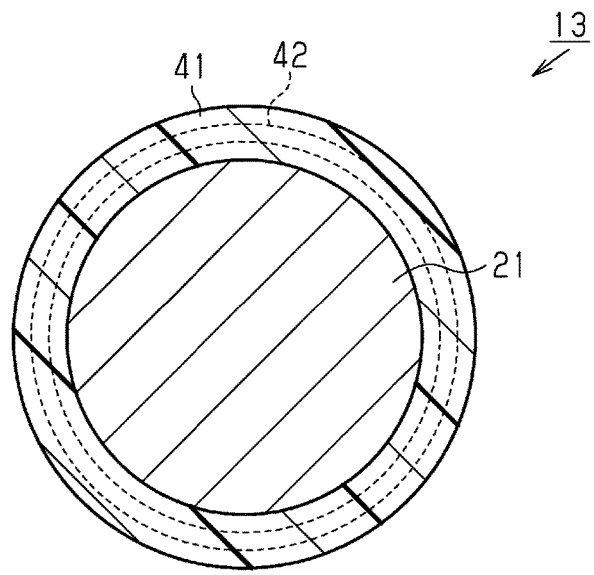
FIG. 4 is a cross-sectional view of a positive high-voltage wire according to a variation.

For example, as shown in FIG. 4, a configuration is possible in which the core wire 21 is covered by one insulating covering 41, and a protection member 42 approximately the same as the protection member 23 of the above embodiment is embedded inside the insulating covering 41. With this configuration, the inner circumferential surface of the insulating covering 41 is located on the inner circumferential side of the protection member 42, and the outer circumferential surface of the insulating covering 41 is located on the outer circumferential side of the protection member 42. Also, the resin that constitutes the insulating covering 41 fills in the spaces between the reinforced fibers that constitute the protection member 42, and the insulating covering 41 and the protection member 42 form an integrated body.

According to this configuration, insulation of the core wire 21 is ensured by the insulating covering 41, and the protection member 42 is not the outermost layer of the positive high-voltage wire 13, and therefore the shape of the positive high-voltage wire 13 can be easily maintained. Furthermore, the insulation layer (resin layer) can be constituted by a single layer while also obtaining the above-described effects, thus making it possible to suppress an increase in the diameter and weight of the positive high-voltage wire 13.

Although the protection member 23 is arranged between the insulating covering 22 and the covering member 24 in the above embodiment, an alternative configuration is possible in which, for example, the protection member 23 is embedded inside the covering member 24, and the protection member 23 and the covering member 24 form an integrated body.

In the positive high-voltage wire 13 of the above embodiment, a configuration is possible in which the covering member 24 is omitted, and the protection member 23 is the outermost layer of the positive high-voltage wire 13.

Although the protection member 23 is provided over approximately the entire length of the positive high-voltage wire 13 in the above embodiment, the present invention is not limited to this, and the protection member 23 may be provided on portions of the positive high-voltage wire 13. With a configuration in which the protection member 23 is provided in portions, if it is possible to predict portions of the positive high-voltage wire 13 in which short-circuiting between the core wires 21 and 31 is likely to occur during a vehicle collision (portions likely to be subjected to impact), it is possible to suppress short-circuiting between the core wires 21 and 31 with use of the protection member 23 while also suppressing the usage amount of the protection member 23 and suppressing a rise in manufacturing cost, which is even more favorable.

Although the protection member 23 is provided on the outer circumferential side of the insulating covering 22 in the above embodiment, the present invention is not limited to this, and the protection member 23 may be provided on the inner circumferential side of the insulating covering 22.

The resin material for forming the covering member 24 is not limited to polyethylene, and the material can be appropriately changed according to the configuration, but it is preferable to use a resin material that is superior in terms of heat resistance.

Although the covering member 24 is formed by extrusion coating in the above embodiment, an alternative configuration is possible in which, for example, the covering member 24 is constituted by a heat-shrink tube.

Although the protection member 23 is provided on only the positive high-voltage wire 13 and not on the negative high-voltage wire 14 in the above embodiment, the present invention is not limited to this, and the protection member 23 may be provided on only the negative high-voltage wire 14 or on both of the high-voltage wires 13 and 14. With a configuration in which the protection member 23 is provided on both of the high-voltage wires 13 and 14, it is possible to improve the impact resistance of the high-voltage wires 13 and 14, thus making it possible to even more favorably suppress short-circuiting between the core wires 21 and 31 of the high-voltage wires 13 and 14.

Although the present invention is applied to the wire harness 10 in which the high-voltage wires 13 and 14 are collectively shielded by the shielding pipe 15 (metal pipe) in the above embodiment, the present invention may alternatively be applied to, for example, a wire harness in which the electrical wires are collectively shielded by a metal braided sleeve, and a corrugated tube or the like is used as exterior member that protects the electrical wires. Also, a configuration is possible in which the shielding pipe 15 that shields both of the high-voltage wires 13 and 14 is omitted, and the high-voltage wires 13 and 14 are each provided with a shield structure (e.g., a metal braided sleeve). In this case, it is desirable that the high-voltage wire includes the protection member 23, and a metal braided sleeve that covers the core wire is provided on the inner circumferential side of the protection member 23.

The wire harness 10 of the above embodiment has a configuration in which two electrical wires, namely the positive high-voltage wire 13 and the negative high-voltage wire 14, are inserted into the shielding pipe 15, but the configuration of the electrical wires that are inserted into the shielding pipe 15 may be appropriately changed according to the configuration of the vehicle. For example, a configuration is possible in which a low-voltage wire for connecting a low-voltage battery and various low-voltage devices (for example, lights or car audio equipment) is added to the electrical wires that are inserted into the shielding pipe 15.

The arrangement relationship of the high-voltage battery 11 and the inverter 12 in the vehicle is not limited to the relationship in the above embodiment, and this arrangement relationship may be appropriately changed according to the configuration of the vehicle. Also, although the high-voltage battery 11 is connected to the inverter 12 via the high-voltage wires 13 and 14 in the above embodiment, a configuration is possible in which the high-voltage battery 11 is connected to a high-voltage device other than the inverter 12.

Although the present invention is applied to the wire harness 10 that connects the high-voltage battery 11 and the inverter 12 in the above embodiment, an alternative configuration is possible in which the present invention is applied to a wire harness that connects a wheel driving motor to an inverter that is connected to a high-voltage battery.

In the above embodiment, as shown in FIG. 5, a shielding member S that forms a continuous tubular body may be constituted by the shielding pipe 15 and a tubular braided sleeve member 51 that is connected to an end portion of the shielding pipe 15 (metal pipe). In the configuration shown here, the braided sleeve member 51 is constituted by weaving metal strands into a mesh, and achieves a shielding function while also being bendable. End portions of the shielding pipe 15 and the braided sleeve member 51 are connected to each other by a ring-shaped connection member 52.

The shielding pipe 15 and the braided sleeve member 51 are made of the same type of metal material as each other (e.g., an aluminum-based metal material). One end portion of the braided sleeve member 51 is connected to the shielding pipe 15, and the other end portion is connected to a connector 53 for connection to the high-voltage battery 11 (or the inverter 12). Also, the outer circumference of the braided sleeve member 51 is covered by an exterior member 54 such as a corrugated tube that has a bellows tube shape. Also, a rubber grommet 55 that prevents the intrusion of water is attached so as to cover the location where the shielding pipe 15 and the braided sleeve member 51 are connected.

The braided sleeve member 51 surrounds the outer circumference of the portions of both of the high-voltage wires 13 and 14 that extend out from an end portion 15*a* of the shielding pipe 15 (outside-of-pipe portions X). Accordingly, the outside-of-pipe portions X of the high-voltage wires 13 and 14 are shielded by the braided sleeve member 51.

With the configuration shown in FIG. 5, the protection member 23 of the positive high-voltage wire 13 is provided in a portion along the length direction of the electrical wire, or more specifically, is provided in only the portion of the positive high-voltage wire 13 that extends inside the braided sleeve member 51 (outside-of-pipe portion X). In this configuration, the protection member 23 covers a range from the connector 53 to the end portion 15*a* of the shielding pipe 15. Note that the end portions of the protection member 23 are fixed to the outer circumferential surface of the insulating covering 22 by being wrapped with adhesive tape (not shown).

According to the above configuration, a portion of the shielding member S in the length direction is constituted by the braided sleeve member 51 formed by woven metal strands, and the protection member 23 is provided in the portion of the positive high-voltage wire 13 that is located inside the braided sleeve member 51. Accordingly, the portion of the positive high-voltage wire 13 that extends inside the braided sleeve member 51 and has concerns regarding impact resistance (outside-of-pipe portion X) is protected by the protection member 23, thus making it possible to effectively protect the positive high-voltage wire 13 (core wire 21).

Note that although the protection member 23 covers a range from the connector 53 to the end portion 15*a* of the shielding pipe 15 in the configuration shown in FIG. 5, an alternative configuration is possible in which, for example, the protection member 23 covers a more narrow range in the length direction of the electrical wire. Also, a configuration is possible in which the protection member 23 extends to a position inside the shielding pipe 15. Furthermore, although the protection member 23 is provided in a portion of the electrical wire in the length direction in the configuration shown in FIG. 5, the present invention is not limited to this, and the protection member 23 may be provided over the entirety of the high-voltage wire 13 in the length direction. Moreover, in the configuration shown in FIG. 5, a covering member 24 that covers the protection member 23 and is substantially the same as in the above embodiment may be provided.

Also, the material forming the braided sleeve member 51 is not limited to being a metal, and a material other than a metal can be used as long as it is an electrically conductive material that can achieve a shielding function. Also, the shielding pipe 15 and the braided sleeve member 51 are not necessarily required to be formed from the same type of metal, and they may be formed from mutually different types of metal.

The above-described embodiment and variations may be appropriately combined.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Wire harness
11 High-voltage battery
13 Positive high-voltage wire
14 Negative high-voltage wire
15 Shielding pipe (shielding member, exterior member)
21 Core wire
22 Insulating covering
23 Protection member
24 Covering member
41 Insulating covering
42 Protection member
51 Braided sleeve member
S Shielding member (exterior member)

The invention claimed is:

1. A wire harness comprising: a plurality of electrical wires including at least one vehicular high-voltage wire for electrical connection to an in-vehicle high-voltage battery, the vehicular high-voltage wire comprising:
   a core wire that is made of a conductor and is to be electrically connected to the high-voltage battery;
   an insulating layer that is made of a resin and overlays an outer circumferential surface of the core wire;
   a protection member that is constituted by woven reinforced fibers and overlays an outer circumferential surface of the insulating layer, the woven reinforced fibers have an insulation property, wherein the protection member with the woven reinforced fibers is flexible; and
   an exterior member that is tubular and surrounds all of the electrical wires,
   wherein included among the plurality of wires are a positive high-voltage wire and a negative high-voltage wire that are respectively connected to a positive terminal and a negative terminal of the in-vehicle high-voltage battery, and
   the protection member is included in only one of the positive high-voltage wire and the negative high-voltage wire.

2. The wire harness according to claim 1, further comprising a covering member that is made of a resin and is shaped as a tube that covers an outer circumference of the protection member.

3. The wire harness according to claim 1, wherein the protection member is embedded inside the insulating layer that covers the outer circumference of the core wire.

4. The wire harness according to claim 1, wherein the reinforced fibers of the protection member are aramid fibers.

5. The wire harness according to claim 1, wherein the exterior member is a shielding member that shields all of the electrical wires.

6. The wire harness according to claim 5,
   wherein a portion or all of the shielding member in a length direction is constituted by a braided sleeve member obtained by weaving electrically conductive strands, and
   the protection member is included in a portion of the vehicular high-voltage wire that is located inside the braided sleeve member.

* * * * *